United States Patent [19]
Yoshida et al.

[11] Patent Number: 5,515,156
[45] Date of Patent: May 7, 1996

[54] ELECTROMAGENTIC WAVE GENERATING DEVICE AND A DISTANCE MEASURING DEVICE

[75] Inventors: Masato Yoshida, Nagaokakyo; Yoshiro Tasaka, Kyoto; Wataru Ishio, Nagaokakyo; Hidenori Miyazaki, Takatsuki, all of Japan

[73] Assignee: Omron Corporation, Kyoto, Japan

[21] Appl. No.: 279,428

[22] Filed: Jul. 25, 1994

[30] Foreign Application Priority Data

Jul. 29, 1993 [JP] Japan .................................... 5-187783

[51] Int. Cl.⁶ ...................................................... G01C 3/08
[52] U.S. Cl. .............................. 356/5.01; 356/3.09; 356/6
[58] Field of Search ................................. 356/5.01, 3.09, 356/6

[56] References Cited

U.S. PATENT DOCUMENTS 5,283,622  2/1994  Ueno et al. .................................. 356/4

FOREIGN PATENT DOCUMENTS

| 122609 | 4/1984 | European Pat. Off. . |
| 2833635 | 2/1980 | Germany . |
| 3001621 | 7/1980 | Germany . |
| 4107850 | 6/1992 | Germany . |

OTHER PUBLICATIONS

"Patent Abstract of Japan," vol. 14, No. 150 (P–1025) 22 Mar. 1990 (JP–A–02 010 282).
"Patent Abstract of Japan," vol. 17, No. 132 (P–1504) 18 Mar. 1993 (JP–A–04 310 890).

*Primary Examiner*—Mark Hellner
*Attorney, Agent, or Firm*—Dickstein, Shapiro & Morin

[57] ABSTRACT

A safety distance measuring device employing an electromagnetic wave is provided. A laser diode 2 is energized to emit laser beams by a laser diode drive circuit 3 in accordance with a clock signal generated by a control circuit 29. The emitted laser beams are sequentially changed to predetermined scanning directions by a scanner 1 associated with control circuit 29. The scanned laser beams from scanner 1 are reflected by an object 19 to be received by a photodiode 5. An output of the photodiode is applied to control circuit 29 through a light receiving circuit 6 where an elapsed time from emission to receipt is computed to obtain a distance from scanner 1 to object 19. Based on data relating to scanning directions by a scanning position detector 4, a begin-and-end detecting circuit 28 can stop the radiation of electromagnetic waves around a scanning start point and a scanning end point which is danger to human bodies.

12 Claims, 12 Drawing Sheets

ELECTROMAGENTIC WAVE GENERATING DEVICE AND A DISTANCE MEASURING DEVICE

BACKGROUND OF THE INVENTION

1. Field of the Invention

This invention relates to a distance measuring device for measuring a distance from the device to an object by using a laser beam or an electromagnetic wave, and more particularly to an improved device designed for a safety operation.

2. Discussion of the Related Art

Referring to FIG. 11, there is shown a block diagram of a conventional distance measuring device employing a laser beam. In accordance with a clock generated from a controller 7, a laser diode (LD) 2 is energized to emit laser beams by a laser diode (LD) driver 3. The laser beams as a kind of electromagnetic waves are sequentially changed to a predetermined directions by a scanner 1 associated with controller 7. Thus emitted laser beams are partially reflected by an object (omitted in the drawing) to be received by a photodiode (PD) 5 for application to controller 7 through a light receiving circuit 6. A scanning position detector 4 is designed to detect a scanning direction and a scanning angular speed of scanner 1 to be applied to controller 7.

Scanner 1 for sequentially changing the emitted beams into the predetermined directions will be described hereinafter in detail in reference to FIG. 12.

In FIG. 12, beams emitted from laser diode 2 are changed to parallel beams P by a collimator lens 9. The parallel beams P are changed to a predetermined direction by a stationary mirror 11 and a scanning mirror 13 for emission. Scanning mirror 13 is adapted to be driven by a motor (omitted in drawings) for sequential scanning directions.

The scanning direction of the radiated parallel beams P can be detected by the scanning position detector having a scanning control laser diode 15 and a position sensing diode (PSD) 17. The scanning direction can be detected by finding a position of position sensing diode 17 which receives a beam emitted from scanning control diode 15 through scanning mirror 13 of a both side mirror type.

As shown In FIG. 13, the emitted beams from scanner 1 are reflected by an object 19. When the reflected beams are received, an elapsed time T1 from emission to receipt is calculated by controller 7. At the same time, the scanning direction (angular speed) can be detected. In view of these data, a distance calculation circuit 8 of FIG. 11 calculates the following distance. A linear distance D from scanner 1 to object 19 can be obtained by multiplying a speed of light by an elapsed time and dividing by two as shown by an equation: $D = T1 \times 299792458/2$ [m/s]. The vertical distance Dc and the parallel distance Ds can be obtained by the following equations.

$$Dc = D \times \cos\theta \, [m/s]$$

$$Ds = D \times \sin\theta \, [m/s]$$

Thus distance measuring device may be employed by radars or vehicles. For example, by installing the device around a bumper of an automobile, a distance from the automobile to its neighbor vehicles can be obtained. The distance between two cars can be obtained by the vertical distance Dc. The existence of a vehicle in its neighbor lane or a distance to the neighbor vehicle therefrom can be found by a parallel distance Ds.

The conventional distance measuring device has several disadvantages. The emitted laser beams are sequentially radiated to predetermined scanning directions by scanner 1. FIG. 14 shows a scanning field 27 between scanning start point and scanning end point. The change of scanning direction is done by the rotation of scanning mirror driven by motor, whereby the angular speeds around scanning start point 21 and scanning end point 23 are accompanied with acceleration or deceleration. The angular speeds around points 21 and 23 are stow in comparison with speeds in other scanning field 25. Since the emission is continuously executed, quantity of light per a unit area becomes increased when the angular speed of the scanning mirror is decreased. The Increased quantity of beams is danger when it hits human eyes, and unfavorable in view of safety control.

SUMMARY OF THE INVENTION

It is, therefore, a primary object of this invention to provide an improved distance measuring device having a means for protecting human eyes from the scanning laser beams emitted from the device.

According to a first aspect of this invention, there is provided a distance measuring device which includes a radiation attenuation means for attenuating the radiation of electromagnetic waves around a scanning start point and a scanning end point. The radiation attenuation means of this device can control the quantity of light of electromagnetic waves which are danger around the scanning start and end points.

According to a second aspect of this invention, there is provided a distance measuring device which includes a radiation attenuation means for ceasing the radiation of electromagnetic waves. The radiation attenuation means can stop the radiation of electromagnetic waves, so that the increased beams around the scanning start and end points can be avoided.

According to a third aspect of this invention, there is provided a distance measuring device including a measurement electromagnetic wave scanning means and a means for receiving a leakage beam from the scanning means to confirm of sound operation thereof. This device can judge the radiation level of the measurement electromagnetic wave scanning means.

According to a fourth aspect of this invention, there is provided a distance measuring device including a measurement electromagnetic wave scanning means which is provided with a first transparent window disposed in an orbit of measurement electromagnetic waves, receives a reflected beam of an emitted electromagnetic wave for measurement reflected by the first transparent window to detect a dirt on the first transparent window in view of the level of the reflected beam, and adjusts the beams emitted by the electromagnetic wave scanning means based on a degree of the detected dirt. This device can detect a level of a dirt on the first transparent window in view of the level of the reflected beam from the first transparent window, and adjust the radiation output of the measurement electromagnetic wave scanning means based on the level the dirt.

According to a fifth aspect of this invention, there is provided a distance measuring device including an electromagnetic detecting means which is provided with a second transparent window disposed within an orbit of the measurement electromagnetic waves and an inspection electromagnetic wave output means for generating an inspection electromagnetic wave during a radiation ceasing period of the measurement electromagnetic wave around the scanning start and end points, the electromagnetic wave detecting means being designed to receive the inspection electromagnetic wave generated by the inspection electromagnetic wave output means and reflected by the second transparent window and to detect a dirt on the second transparent window during the radiation ceasing period of the measurement electromagnetic wave based on the level of the received inspection electromagnetic wave. Based on the level of the inspection electromagnetic wave generated by the inspection electromagnetic wave output means and reflected by the second transparent window, this device can execute the operation for detecting dirts on the second transparent window during the period when the radiation of the measurement electromagnetic wave ceases.

According to a sixth aspect of this invention, there is provided a distance measuring device including an electromagnetic detecting means which is provided with a second transparent window disposed within an orbit of the measurement electromagnetic waves and an inspection electromagnetic wave output means for generating an inspection electromagnetic wave during a radiation ceasing period of a measurement electromagnetic wave around the scanning start and end points, the electromagnetic wave detecting means being designed to receive the inspection electromagnetic wave generated by the inspection electromagnetic wave output means and reflected by the second transparent window and to detect based on the level of the received inspection electromagnetic wave whether or not the function of the electromagnetic detecting means is normal. Based on the level of the inspection electromagnetic wave generated by the inspection electromagnetic wave output means and reflected by the second transparent window, this device can judge whether the function of the electromagnetic wave detecting means is normal or not.

According to a seventh aspect of this invention, there is provided a distance measuring device including a radiation level controlling means for controlling the radiation level of an electromagnetic wave radiation means in proportion to the absolute value of the scanning angular speed. The radiation level controlling means can control the level of the electromagnetic wave at a danger radiation point.

According to eighth aspect of this invention, there is provided an electromagnetic wave generating device in which the emission power of electromagnetic wave decreases as the angular speed of change of the emission direction of the electromagnetic wave decreases. Since the emission power becomes small when the angular speed of change of the emission direction of electromagnetic wave is small, the affection of electromagnetic wave radiated to human eyes is extremely reduced.

According to ninth aspect of this invention, there is provided an electromagnetic wave generating device in which the emission power of electromagnetic wave can be minimized at the both ends of scanning in reciprocal scanning movement of the electromagnetic wave. Since the electromagnetic wave power is minimized at the both ends of scanning, the safety control for human eyes is ensured.

According to tenth aspect of this invention, there is provided an electromagnetic wave generating device in which the emitted electromagnetic wave power is reduced to zero when the angular speed of change of the emission direction of the electromagnetic wave is zero. Since the emitted electromagnetic wave power is reduced to zero when the angular speed of change of the emission direction of electromagnetic wave is zero, the safety at the both ends of scanning is extremely ensured.

Thus, according to this invention, danger by the increased quantity of beam caused by decrease of the angular speed of the emission direction of electromagnetic wave can be avoided.

BRIEF DESCRIPTION OF THE DRAWINGS

Other objectives and advantages of this invention will be more readily apparent from the following detailed description provided in conjunction with the following figures, of which.

DETAILED DESCRIPTION OF THE INVENTION

Figure 1:
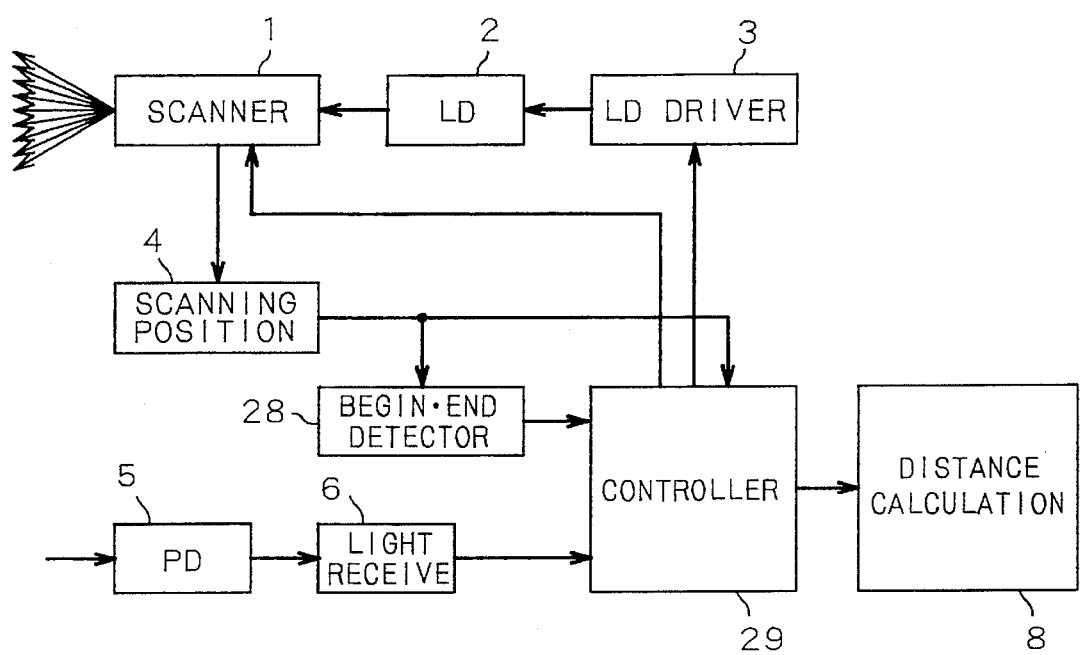
FIG. 1 is a block diagram of a distance measuring device as a preferred embodiment of this invention.

Referring, now, to FIG. 1, there is shown a block diagram of a distance measuring device as a preferred embodiment of this invention.

In accordance with a clock generated from a controller or controlling circuit 29, a laser diode (LD) 2 is energized to emit laser beams by a laser diode (LD) driver (drive circuit) 3. The laser beams as a measurement electromagnetic wave are sequentially changed to predetermined directions by a scanner 1 associated with controlling circuit 29. Thus emitted laser beams are partially reflected by an object (omitted in the drawing) to be received by a photodiode (PD) 5 for application to controlling circuit 29 through a light receiving circuit 6. A scanning position detector 4 is designed to detect a scanning direction and a scanning angular speed of the laser beam scanned by scanner 1 to be applied to a begin-and-end point detector 28. Detector or detecting circuit 28 generates data relating to emitted beams for application to controlling circuit 29 to control laser diode drive circuit 3.

Scanner 1 for sequentially changing the emitted beams into the predetermined directions will be described in detail hereinafter in reference to FIG. 2.

Figure 2:
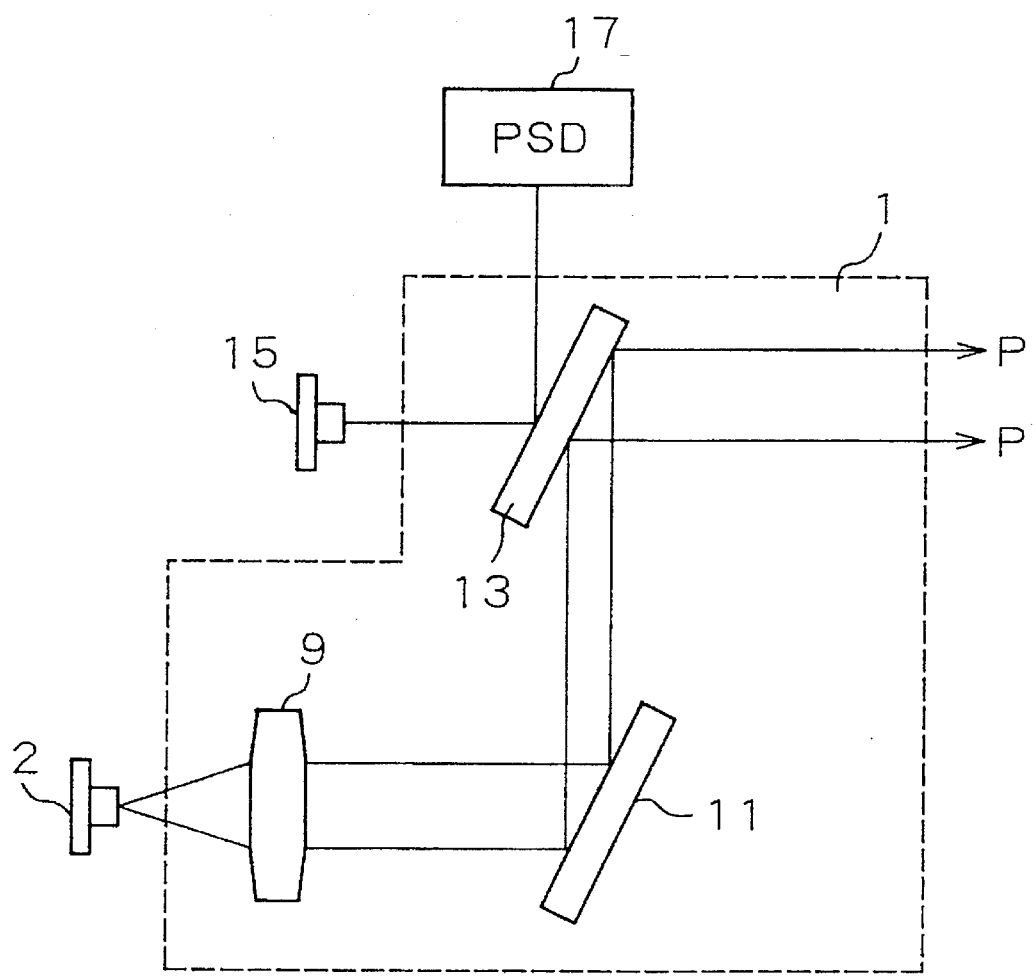
FIG. 2 shows a construction of a scanner employed in the device of FIG. 1.

In FIG. 2, beams emitted from laser diode 2 are changed to parallel beams P by a collimator lens 9. The parallel beams P are changed to a predetermined direction by a stationary mirror 11 and a scanning mirror 13 for emission.

Figure 3:
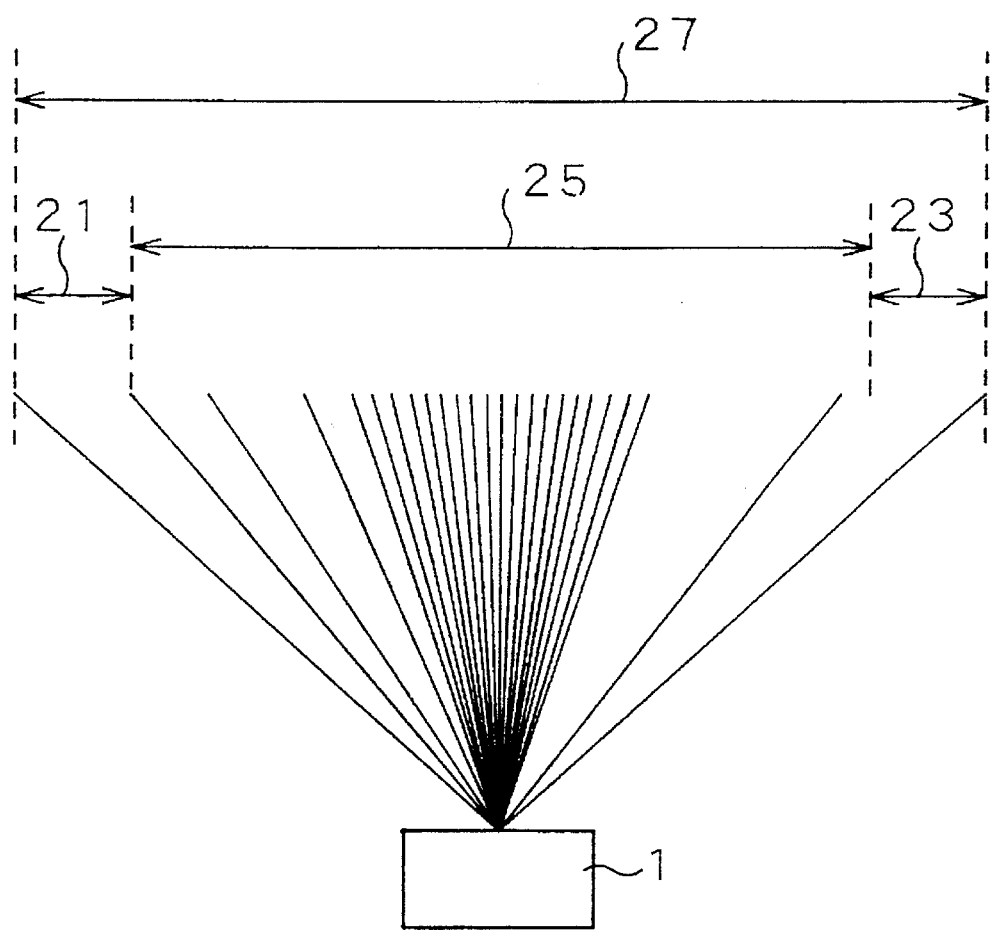
FIG. 3 shows a scanning field by the scanner.

Scanning mirror 13 is adapted to be driven by a motor (omitted in drawings) for sequential scanning directions. For instance, FIG. 3 shows a scanning field 27 from a scanning beginning or start point to a scanning end point.

The change of the scanning direction is done by rotation of the scanning mirror driven by motor, whereby the angular speeds around scanning start point 21 and scanning end point 23 are accompanied with acceleration or deceleration. The angular speeds around points 21 and 23 are slow in comparison with speeds in other scanning field 25.

The scanning direction of parallel beams P emitted therefrom can be detected by the scanning position detector having a scanning control laser diode 15 and a position sensing diode (PSD) 17. The scanning direction can be detected by finding a position of position sensing diode 17 which receives a beam emitted from scanning control diode 15 through scanning mirror 13 of a both side mirror type.

Figure 4:
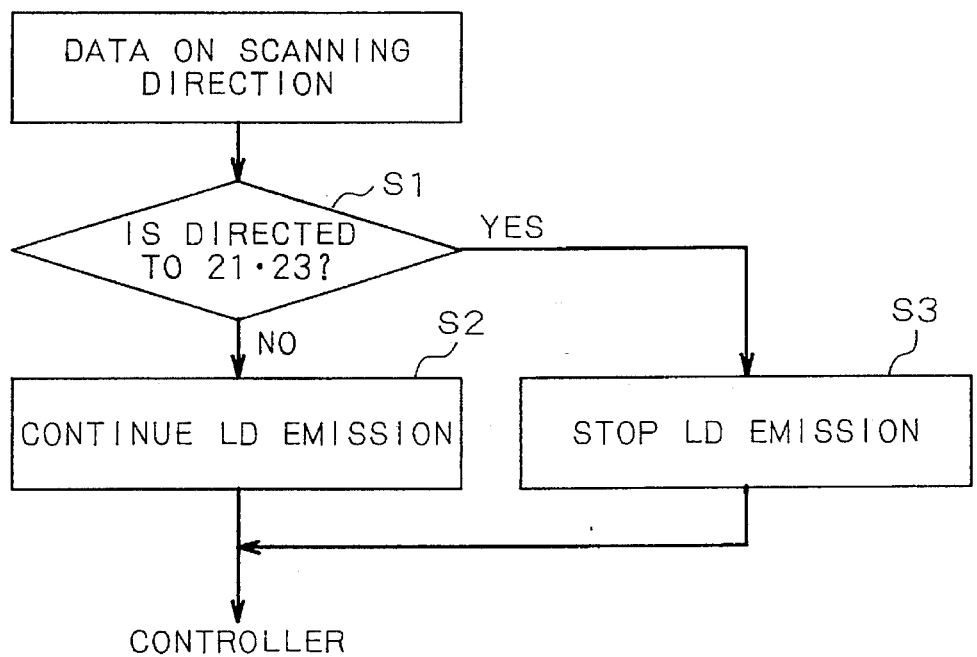
FIG. 4 is a flow chart showing a function of a start-and-end point detector.

Begin-and-end point detection circuit 28 of FIG. 1 will be described in reference to a flow chart of FIG. 4.

By employing input data relating to a scanning direction generated from scanning position detector 4, it is enquired if the scanning direction is directed to predetermined scanning start and end points 21 and 23 (step S1). If an YES response is produced, a laser diode (LD) emission stop data is generated (step S2). If a NO response is produced, a laser diode (LD) emission Continuation data is generated (step S3). These data are applied to controller 29 to control laser diode drive circuit 3. Thus, the beam radiation ceases around scanning start point 21 and scanning end point 23 which are critical in view of safety control.

Figure 5:
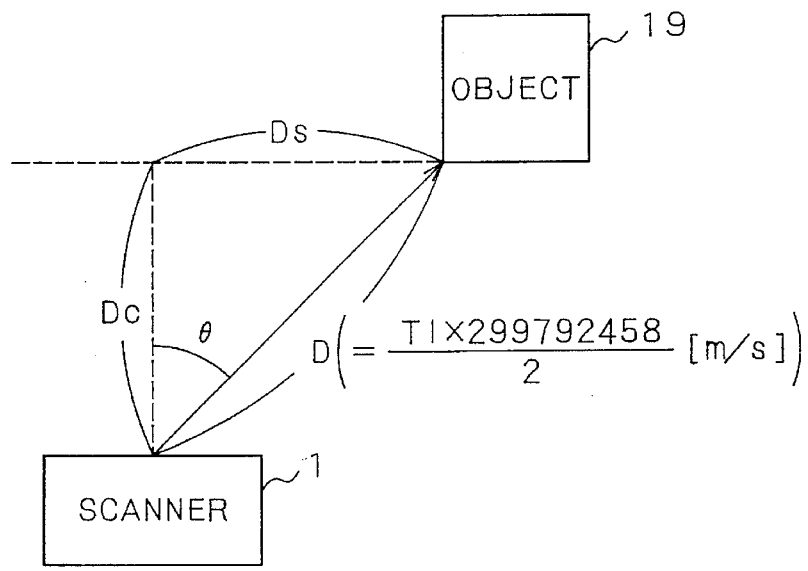
FIG. 5 shows a distance from the scanner to an object to be measured.

As shown in FIG. 5, the beams emitted from scanner 1 are reflected by an object 19 to be measured. When the reflected beams are received, an elapsed time T1 from emission to receipt is calculated by control circuit 29. At the same time, the scanning direction (scanning angle) can be detected view of these data, a distance calculation circuit 8 calculates the following distance. A linear distance D from scanner 1 to object 19 can be obtained by multiplying a speed of light by an elapsed time and dividing by two as expressed by an equation: $D=T1\times 299792458/2$ [m/s]. The vertical distance Dc and the parallel distance Ds can be obtained by the following equation.

$Dc=D\times COS\ \theta$[m/s]

$Ds=D\times SIN\ \theta$[m/s]

Thus, the various distances from scanner 1 as a beam source to object 19 can be obtained.

The distance measuring device of this embodiment is provided with a fail safe function (FS) which will be described hereinafter.

Figure 6:
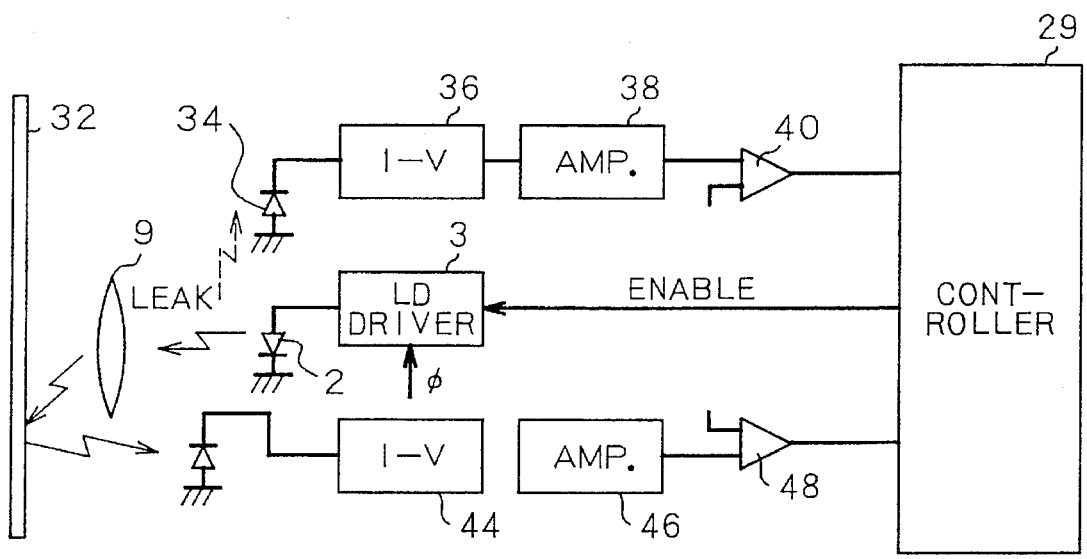
FIG. 6 is a block diagram of a fail safe function at a beam emission section of the distance measuring device.

In FIG. 6, there is shown a block diagram relating to the fail safe function at a beam emission or light projection section of the distance measuring device. A projection window 32 as a first transparent window is disposed within an orbit of measurement laser beams emitted, from scanner 1.

Laser diode 2 is energized by laser diode driver 3 in accordance with an enable signal based on a clock signal supplied by control circuit 29 to emit laser beams. The emitted laser beams are radiated from projection window 32 through a projection lens 9. A photodiode 34 for a laser diode power detection receives a leakage beam from the emitted beams to inspect the projection function.

A signal from photodiode 34 receiving the leakage beam is converted from current to voltage by I/V converter 36, and amplified by an amplifier 38 for application to a comparator 40 as a light received signal. Comparator 40 compares the light received signal with a predetermined threshold value to apply its output as data (light received level) to control circuit 29.

If projection window 32 is dirty, laser beams are partially reflected by projection window 32 so that a dirt on window 32 can be detected. The beams reflected by the dirt on projection window 32 are received by a dirt detection photodiode 42 to generate a current signal. The current signal is converted from current to voltage by I/V converter 44, and amplified by amplifier 46 to be applied to a comparator 48 as a light received signal. The comparator compares the light received signal with a predetermined threshold value to apply its output as data (light received level) to the control circuit 29.

Figure 7:
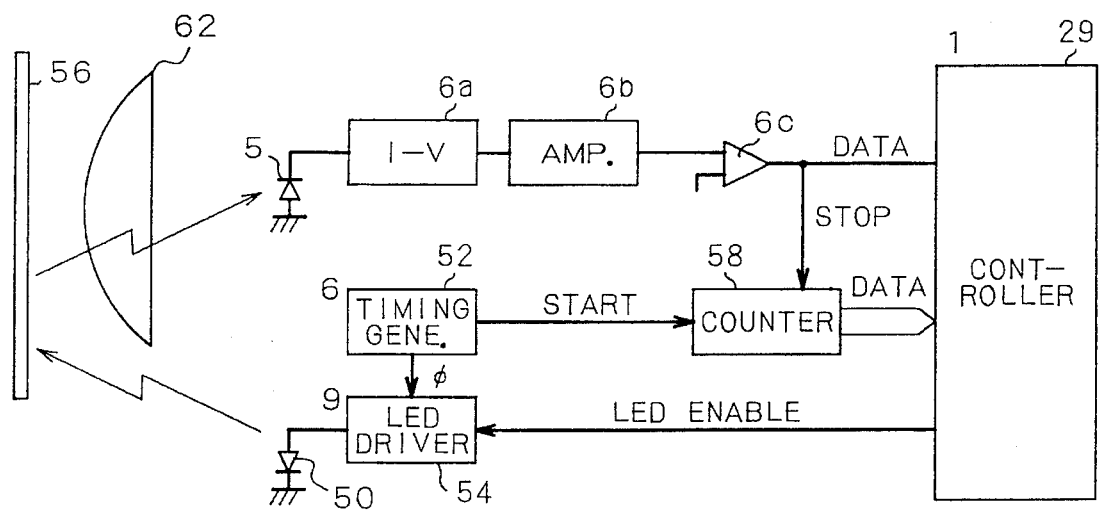
FIG. 7 is a block diagram of a fail safe function at a beam receiving section of the distance measuring device.

Referring to FIG. 7, there is shown a block diagram of a fail safe function at a beam or light receiving section of the distance measuring device. A light receiving window 56 as a second transparent window is disposed within a orbit of measurement laser beams.

An inspection light emitting diode (LED) 50 as an inspection electromagnetic wave output means is disposed at the light receiving section. Inspection LED 50 is driven by a LED driver 54 based on a timing generated from a timing generator 52 in accordance with a LED enable signal from control circuit 29 to emit an inspection beam as an inspection electromagnetic wave. The inspection beam is projected toward light receiving window 56 to inspect a light receiving function. Timing generator 52 simultaneously applies a start signal to a counter 58 at the same timing when the inspection beam is emitted. The emitted inspection beams reach transparent window 56 where most of them pass through the window but a part of them are reflected. The reflected beams can be received by a photodiode 5 for distance detection through light receiving lens 62.

An output signal of photodiode 5 receiving beams is converted from current to voltage by I/V converter 6a, and amplified by amplifier 6b to be applied to comparator 6c as a light received signal. Comparator 6c compares the light received signal with a plurality of predetermined threshold values to apply to controller 29 data of a received light level corresponding to the quantity of the received light, and simultaneously applies a stop signal to counter 58 to stop its counting to be applied to controller 29 as count data. The above-mentioned light receiving circuit 6 corresponds to I/V converter 6a, amplifier 6b, and comparator 6c.

Quantity of light received by photodiode 5 allows the detection of dirt on light receiving window 56. A beam reflected by light receiving window 56 is received by photodiode 5 in a dirt detection mode. An output signal of photodiode 5 receiving beams is converted from current to voltage by I/V converter 6a, and amplified by amplifier 6b to be applied to comparator 6c as a light received signal. Comparator 6c compares the light received signal with a predetermined threshold value to apply its output as data to controller 29.

The above-mentioned inspection at the light receiving section must be executed when emission by measurement laser diode 2 ceases. The distance measuring device of this embodiment is designed to stop the radiation of measurement electromagnetic wave around the scanning start point and the scanning end point, whereby the fail safe function at the light receiving section can be executed when the radiation stops.

Figure 8:
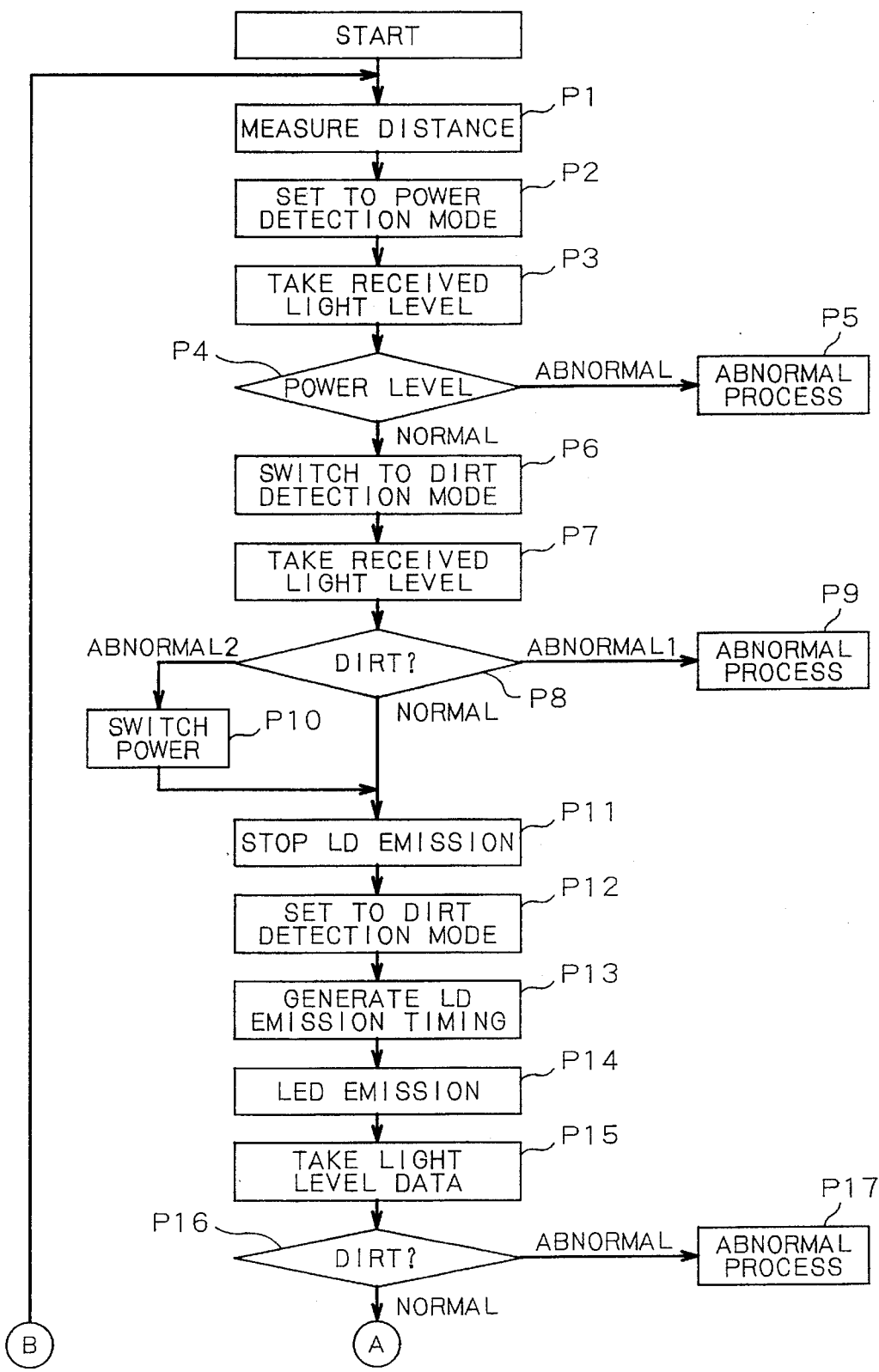
FIGS. 8 and 9 show a flow chart of a process of the fail safe function of FIGS. 6 and 7.
Figure 9:
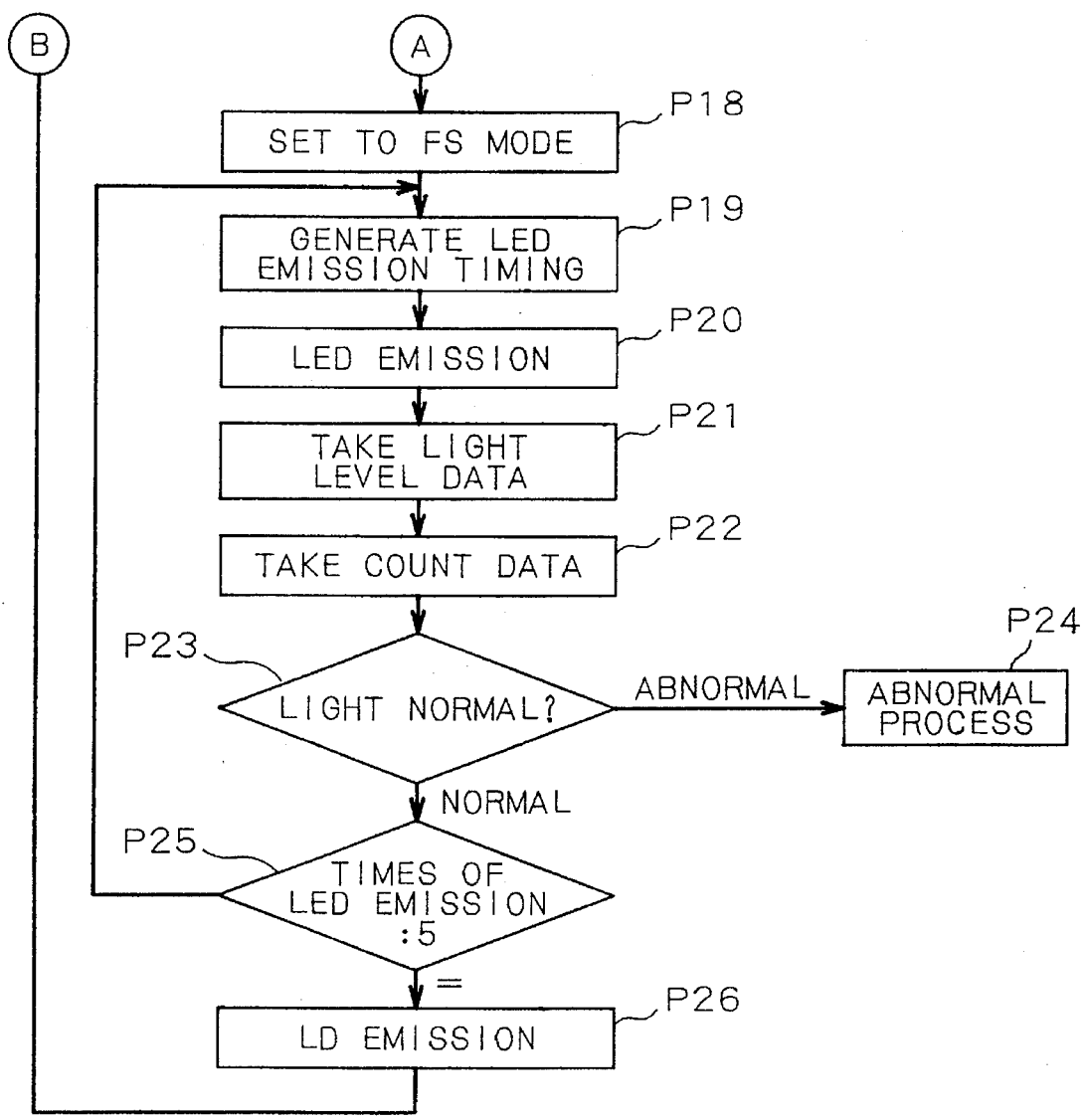

A flow chart for explaining the fail safe function is shown in FIGS. 8 and 9.

Upon starting the distance measurement device, a normal operation for distance measurement is initiated (step P1). During the distance measurement operation, the following fail safe process is periodically (for instance, once a 100 ms) executed. Initially, the sequence is set to power detection mode in a light projection section (step P2). In this mode, a leakage beam of laser diode 2 is received by laser diode power detection photodiode 34, and controller 29 takes the level of the received beam (step P3). Subsequently, the power of the received light level is inspected (step P4). If the power is a predetermined level or larger, it is regarded as normal emission and the sequence moves to a subsequent step P6. If the power is less than the predetermined level, it is judged that laser diode 2 is abnormally emitting beams due to an abnormal state and an abnormal process is executed (step P5). Thus, power check of laser diode 2, abnormal check of laser diode 2 and abnormal check of laser diode drive circuit 3 are executed as the fail safe function of the light projecting section.

If a normal response is produced in the step P4, the sequence is switched to a dirt detection mode in the light projection section (step P6). In this mode, the beam reflected by light projecting window 32 is received by dirt detection photodiode 42 for the light projection section. The level of received light is applied to comparator 46 for comparison with a plurality of predetermined threshold values to obtain threshold value level corresponding to the level of received light (step P7). The threshold level represents a dirt on light projection window 32. When it exceeds a predetermined threshold value level, a normal operation of distance measuring becomes difficult. Accordingly, the threshold level in which the normal operation becomes impossible is called as a light projection dirt threshold level hereinafter.

In control circuit 29, when the input threshold value is the light projection dirt threshold level or larger (step an ABNORMAL 1 is produced and an abnormal process is executed (step P9). When the input threshold value is not large like the light projection dirt threshold level but a little larger than normal reflection level (called as a power-up level), an ABNORMAL 2 is produced (step P8). That is, when the light projection section is a little dirty, the emission power of laser diode 2 is switched to be increased (step P10). Thus, the measuring capability is not deteriorated by slight dirt in the light projection section.

As described above, the emission of laser diode 2 stops for executing the inspection at the light receiving section (step P11). The time period for stopping the emission is set around scanning start and end points in distance measurement. The sequence is set to a dirt detection mode in the light receiving section (step P12). In this mode, timing for LED emission is generated (step P13). Emission of LED 50 is generated according to the timing (step P14). The beams emitted by LED 50 are partially reflected by light receiving window 56 to be received by photodiode 5 disposed for distance measurement. Light received level corresponding to quantity of received light is obtained. The light received level is taken as light receipt data (step P15), and represents dirt on light receiving window 56. If it becomes larger than a predetermined light received level, the normal distance measuring cannot be executed. Accordingly, the light received level when normal distance measuring operation becomes impossible is called as light receiving section threshold level hereinafter.

In control circuit 29, the input light received level is judged (step P16), and, when it is at the light receiving section threshold level or larger, an abnormal process is executed (step P17).

If the input level is normal, the sequence moves to a step P18 in FIG. 9 where it is set to fail safe (SF) mode in the light receiving section. In this mode, initially, timing is generated for emission of LED (step P19), and causes LED's emission (step P20). At the same time, counter 58 is initiated. Laser beams emitted from LED 50 are slightly reflected by light receiving window 56. The reflected beams are received by photodiode 5, and the light received level corresponding to quantity of received beams is obtained to be taken as light received data (step P21). Simultaneously, the counter is stopped and the light received data is applied to control circuit 29 as count data (step P22).

In control circuit 29, the taken light received level and count value are compared with predetermined levels. If they are out of set values, it is judged that there is an abnormal state in some of light receiving lens, light receiving lens, light receiving circuit and so forth (step P23). If abnormal state is found, control circuit 29 executes an abnormal process (step P24).

Emission timing is changed (count data for detection is changed), and the above-mentioned light receiving section fail safe process is repeated by several times (step P25) for improving detection precision.

Thus, the fail safe function at the light receiving section is executed by checking any abnormality of lens, mounting position, photodiode, light receiving circuit and so forth. Unless any abnormal exists after the series of checking operations, the laser diode emits for normal distance measuring operation (step P26).

Thus, the fail safe operation can be executed with measuring operation in the distance measuring device.

The distance measuring device of this embodiment may be employed by radars or vehicles. For example, by installing the device around a bumper of an automobile, a distance from the automobile to its around vehicles can be obtained. The distance between two cars can be obtained by the vertical distance Dc. The existence of a vehicle in its neighbor lane or a distance to the neighbor vehicle therefrom can be found by a parallel distance Ds.

Though the radiation of laser beams are stopped around scanning start and end points 21 and 23 by the radiation attenuating means in this embodiment, the level thereof may be attenuated without stopping if desired.

The begin-and-end point detection circuit 28 of this embodiment controls the radiation to be stopped based on the data about scanning directions generated from scanning position detection circuit 4. As a modification of this embodiment, a radiation level control means is employed to control the level of the radiation in proportion to the absolute value of scanning angular speed as shown in FIG. 10.

Figure 10:
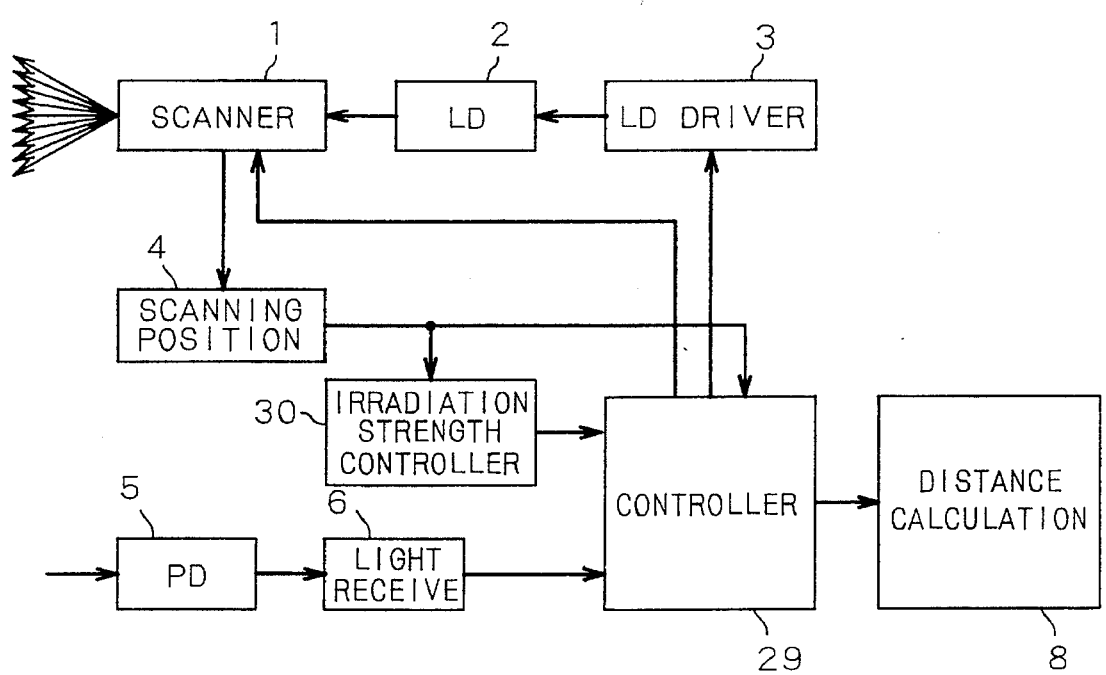
FIG. 10 is a block diagram of a distance measuring device as a modified embodiment of this invention.
Figure 11:
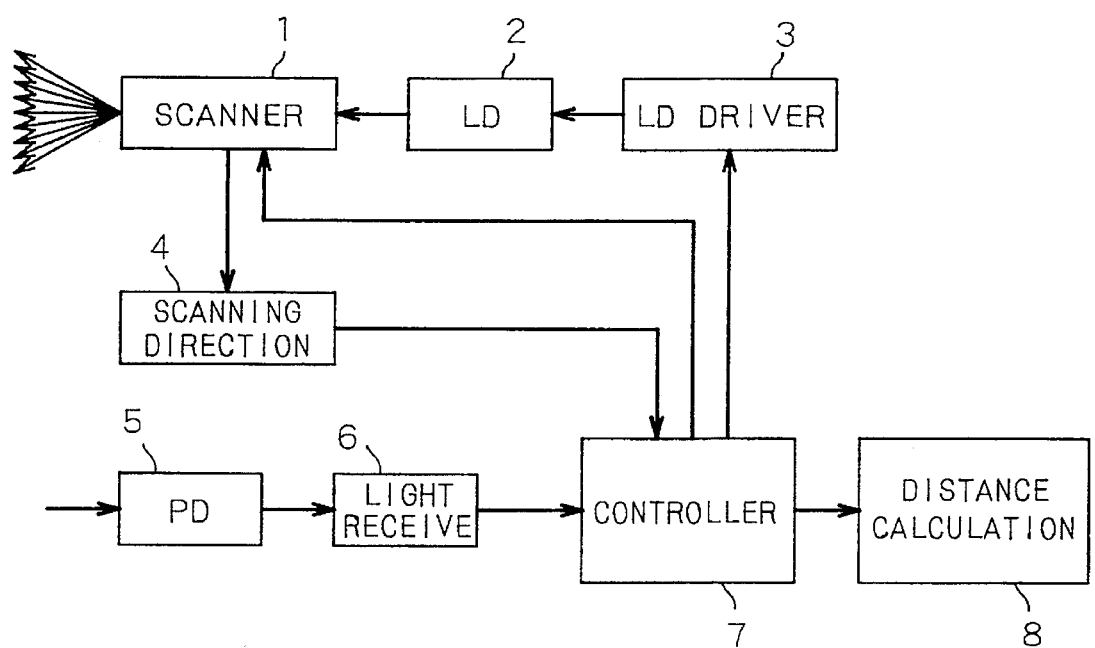
FIG. 11 is a block diagram of a conventional distance measuring device.
Figure 12:
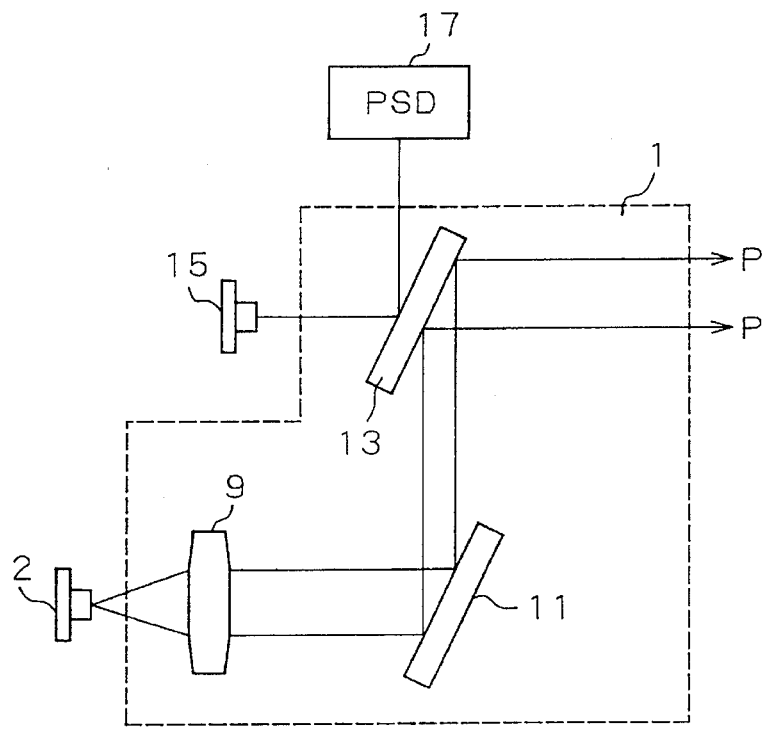
FIG. 12 is a construction of a scanner employed in the conventional device of FIG. 12.
Figure 13:
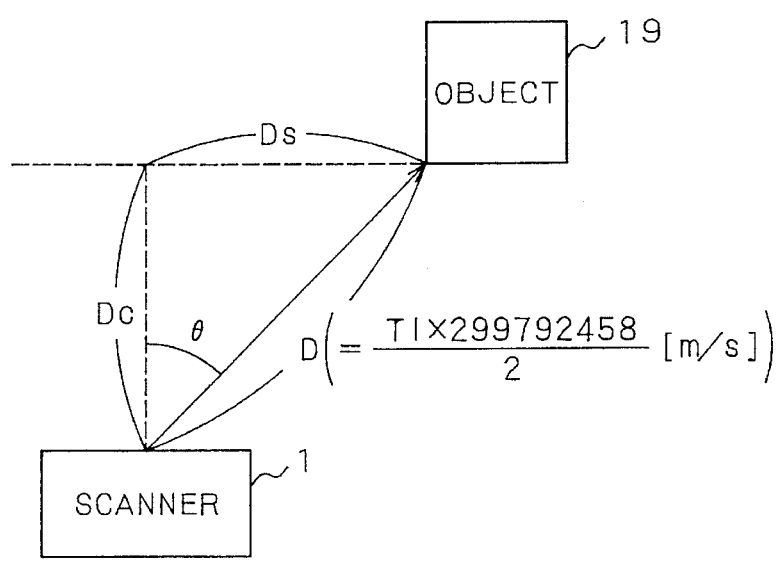
FIG. 13 shows a distance between the conventional scanner and an object to be measured.
Figure 14:
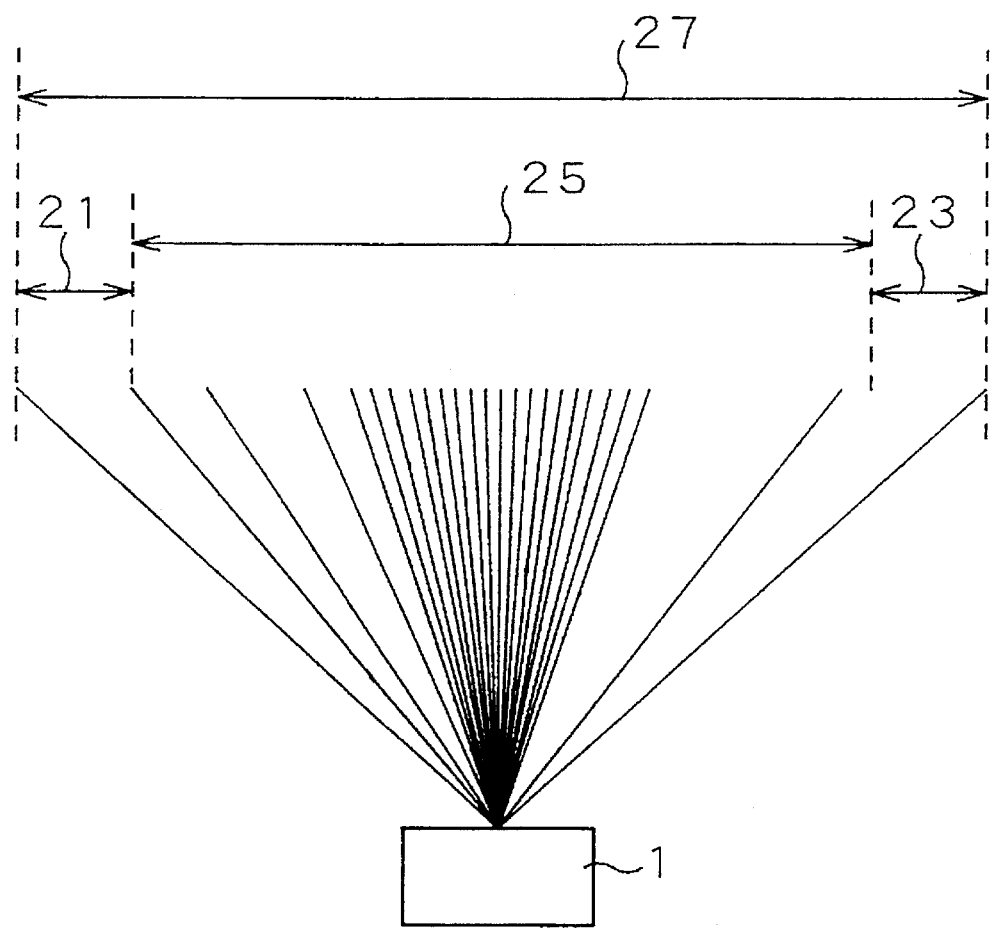
FIG. 14 shows a field of scanning by the scanner.

In the distance measuring device of FIG. 10, an irradiation strength controller 30 is employed instead of the begin-and-end point detection circuit 28 as the radiation level control means. The controller 30 controls laser diode driver 3 based on data of scanning angular speeds provided from scanning position detecting circuit 4 to make the radiation level in proportion to the absolute value of scanning angular speed.

In the distance measuring device of FIG. 1, control circuit 29 time-differentiates scanning angular data generated from scanning position detector 4 to obtain an angular speed of scanning of scanner 1, and drives laser diode circuit 3 so as to emit laser diode 2 with emission power in proportion to the obtained angular speed. If desired, control circuit 29 may be modified to drive laser diode drive circuit 3 so that laser diode 2 stops to emit beams when the absolute value of angular speed of scanning of scanner 1 is lower than a predetermined threshold value. If modified so, the security control is improved in comparison with the construction that the emission power is made in proportion to the angular speed of scanning.

While the invention has been described and illustrated with respect to certain embodiments which give satisfactory results, it will be understood that those skilled in the art, after understanding the purpose of the invention, that various other changes and modifications may be made without departing from the spirit and scope of the invention, and it is therefore, intended in the appended claims to cover all such changes and modifications.

What is claimed is:

1. A distance measuring device comprising measurement electromagnetic wave scanning means for radiating a measurement electromagnetic wave with scanning from a scanning start point to a scanning end point, electromagnetic wave detecting means for detecting the radiated measurement electromagnetic wave which is reflected on a reflection point of an object to be detected thereby, operation means for measuring an elapsed time from emission to detection of the electromagnetic wave and for calculating a distance between said measurement electromagnetic wave scanning means and said reflection point based on the measured elapsed time, and radiation attenuation means for attenuating the radiation of the measurement electromagnetic waves around said scanning start point and said scanning end point.

2. A distance measuring device according to claim 1, in which said radiation attenuation means is designed to cease the radiation of said measurement electromagnetic waves.

3. A distance measuring device according to claim 1 further including means for receiving a leakage beam from said measurement electromagnetic wave scanning means to confirm whether or not the function of said measurement electromagnetic wave scanning means is normal in view of level of the leakage beam.

4. A distance measuring device according to claim 1, in which said measurement electromagnetic wave scanning means is provided with a first transparent window disposed in an orbit of the measurement electromagnetic waves, receives a reflected beam of the radiated measurement electromagnetic wave reflected by said first transparent window to detect a dirt on the first transparent window in view of the level of the reflected beam, and adjusts the radiation output of said measurement electromagnetic wave scanning means based on a degree of the detected dirt.

5. A distance measuring device according to claim 2 in which said electromagnetic wave detection means is provided with a second transparent window disposed within the orbit of said measurement electromagnetic waves and inspection electromagnetic wave output means for generating an inspection electromagnetic wave during a radiation ceasing period of measurement electromagnetic waves around said scanning start and end points, the electromagnetic wave detection means being designed to receive the inspection electromagnetic wave generated by said inspection electromagnetic wave output means and reflected by said second transparent window and to detect dirts on the second transparent window during the radiation ceasing period of the measurement electromagnetic waves based on the level of the received inspection electromagnetic wave.

6. A distance measuring device according to claim 2 in which said electromagnetic wave detection means is provided with a second transparent window disposed within an orbit of said measurement electromagnetic wave and an inspection electromagnetic wave output means for generating an inspection electromagnetic wave during a radiation ceasing period of said measurement electromagnetic wave around the scanning start and end points, said electromagnetic wave detecting means being designed to receive the inspection electromagnetic wave generated by the inspection electromagnetic wave output means and reflected by the second transparent window and to detect based on the level of the received inspection electromagnetic wave whether or not the function of the electromagnetic detecting means is normal.

7. A distance measuring device comprising measurement electromagnetic wave scanning means for radiating a measurement electromagnetic wave with scanning from a scanning start point to a scanning end point by changing a scanning angular speed, electromagnetic wave detecting means for detecting said radiated measurement electromagnetic wave reflected by a reflection point of an object to be detected, operating means for measuring an elapsed time from emission to detection of said measurement electromagnetic wave and for calculating a distance between said measurement electromagnetic wave scanning means and said reflection point based on the measured elapsed time, and radiation level controlling means for controlling the radiation level of electromagnetic radiation means in proportion to the absolute value of a scanning angular speed.

8. An electromagnetic wave generating device comprising electromagnetic wave emitting means for emitting an electromagnetic wave, emission direction controlling means for controlling an emission direction of said electromagnetic wave emitted by said electromagnetic wave generating device, angular speed detecting means for detecting an angular speed of the emission direction varied with said emission direction controlling means, and electromagnetic wave power controlling means for decreasing an electromagnetic wave power emitted by said electromagnetic wave emitting means as the angular speed detected by said angular speed detecting means decreases.

9. An electromagnetic wave generating device according to claim 8 in which said emission direction controlling means scans said electromagnetic wave between a scanning start point and a scanning end point.

10. An electromagnetic wave generating device according to claim 8 in which said electromagnetic wave power controlling means turns the electromagnetic wave power emitted from said electromagnetic wave emitting means to zero when the angular speed detected by said angular speed detecting means is zero.

11. An electromagnetic wave generating device comprising an electromagnetic wave emitter for emitting an electromagnetic wave, an emission direction controller for controlling an emission direction of said electromagnetic wave emitted by said electromagnetic wave generating device, an angular speed detector for detecting an angular speed of the emission direction varied with said emission direction controlling means, and an electromagnetic wave power controller for decreasing an electromagnetic wave power emitted by said electromagnetic wave emitting means as the angular speed detected by said angular speed detecting means decreases.

12. A method of an electromagnetic wave emission comprising the steps of emitting an electromagnetic wave, controlling an emission direction of said electromagnetic wave emitted by said electromagnetic wave generating device, detecting an angular speed of the emission direction varied with said emission direction controlling means, and decreasing an electromagnetic wave power emitted by said electromagnetic wave emitting means as the angular speed detected by said angular speed detecting means decreases.

* * * * *